Patented July 7, 1931

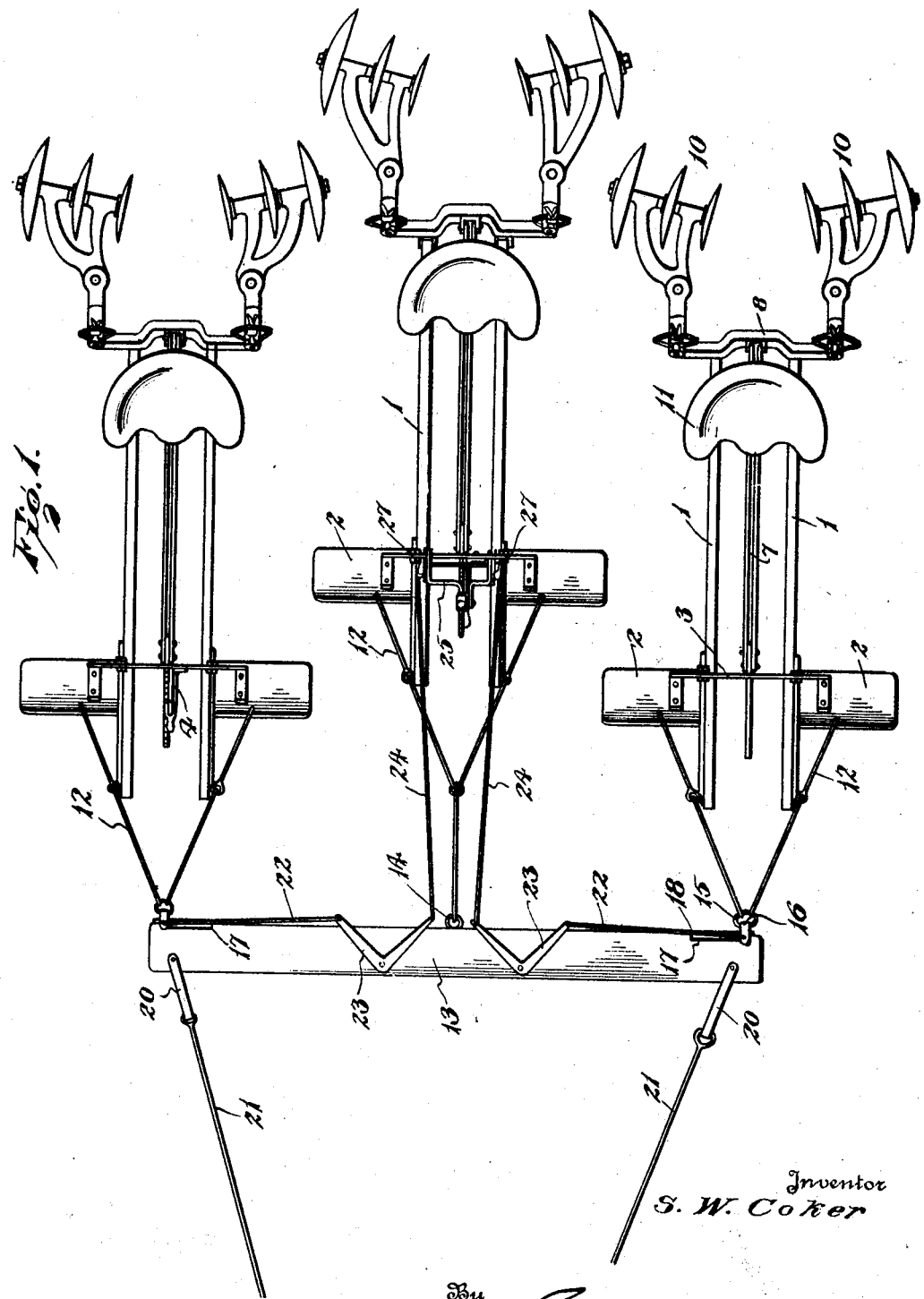

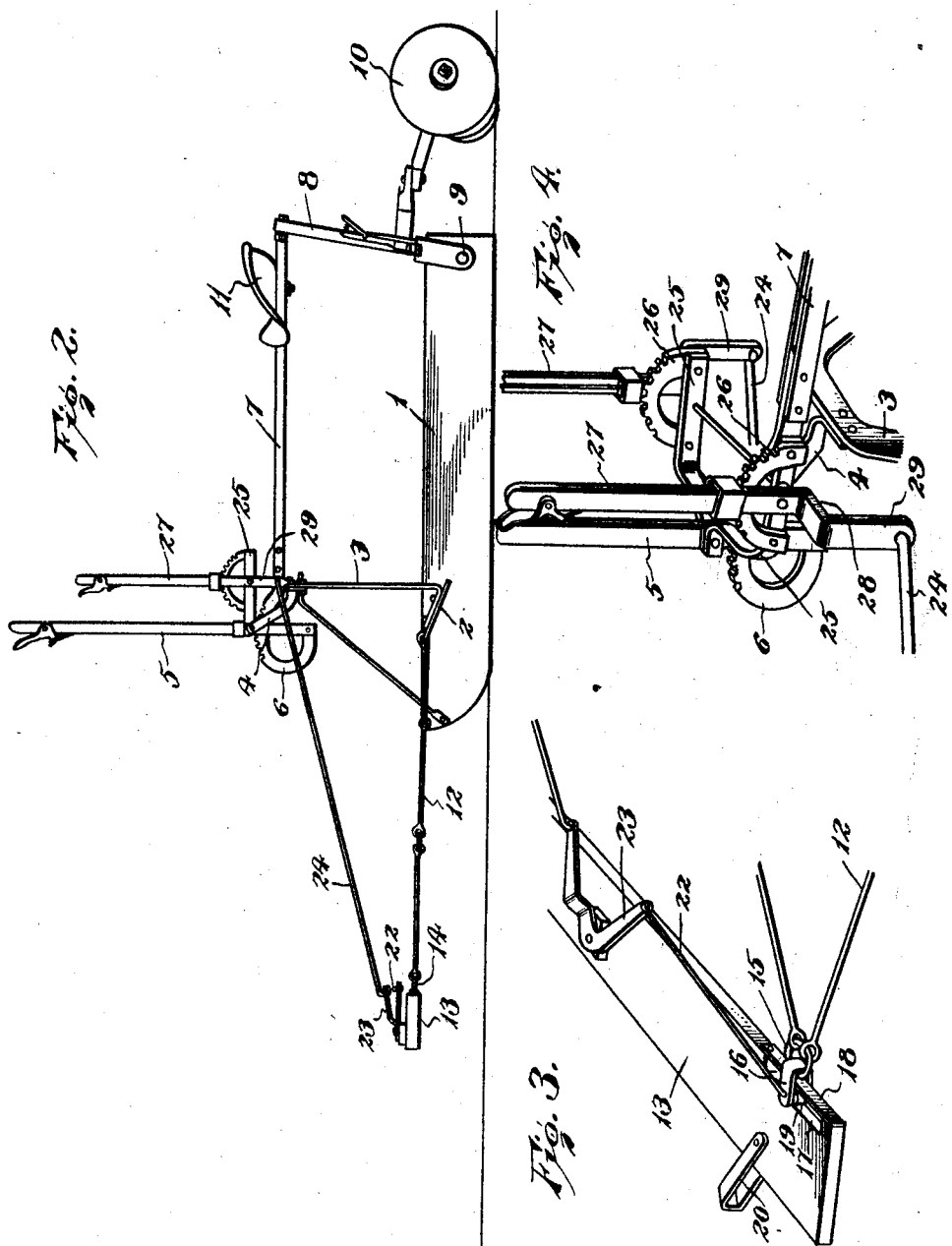

1,813,438

UNITED STATES PATENT OFFICE

SAMUEL W. COKER, OF LUBBOCK, TEXAS

AGRICULTURAL IMPLEMENT

Application filed March 6, 1930. Serial No. 433,699.

This invention relates to agricultural implements and has special reference to the means for connecting gangs of cultivators or like implements with a tractor or other source of power. The object of the invention is to provide a simple and easily manipulated mechanism whereby three or more rows of plants may be cultivated simultaneously and the cultivators or other implements set to correspond to the distance between the rows. It has been heretofore possible to cultivate two rows simultaneously and to adjust the gangs of implements to correspond to the distance between the rows but there has been no practical means provided heretofore for adjusting three gangs of implements to the distance between the rows inasmuch as when it was attempted to adjust the gangs to closely spaced rows the middle gang would interfere with the adjustment of the outer gangs so that the desired adjustment could not be effected. My invention overcomes this difficulty and provides a very simple means whereby the outer gangs may be easily set closer to or farther from the center gang and may be dissimultaneously adjusted so as to accommodate unequal spacing of the rows. The invention is illustrated in the accompanying drawings and will be hereinafter fully set forth.

In the drawings:

Figure 1 is a plan view of a cultivator including three gangs of disk cultivators and embodying the invention;

Fig. 2 is a central longitudinal section;

Fig. 3 is an enlarged detail perspective view of part of the laterally shiftable mechanism, and Fig. 4 is an enlarged detail perspective view of the adjusting levers.

I have illustrated the invention applied to a machine including three gangs of disk cultivators but it will be understood that the invention may be embodied in harrows or other like tilling machines. In the present illustration, the reference numeral 1 indicates runners, a pair of which is provided for each cultivator and to which near their front ends are secured laterally extending foot rests 2. Carried by the foot rests and the front ends of the runners is a frame 3 including a yoke which bridges the runners and to the arch of which is secured a bracket 4 having a hand lever 5 mounted thereon, the lower end of said lever being pivoted to a rack 6 which is fixed to the front end of a beam 7 extending longitudinally of the cultivator and having its rear end pivotally connected to a rear arched frame 8 which is pivotally mounted upon the rear ends of the runners, as indicated at 9, and carries the gangs 10 of cultivator disks. A driver's seat 11 is also carried by the beam 7, as shown. It will be understood that by manipulation of the hand lever 5, the cultivator disks may be raised or lowered so as to be held in an inoperative position when the machine is being moved from field to field or be set to penetrate the soil to any desired depth. A more detailed description of these parts is deemed unnecessary inasmuch as they are well known and, in themselves, form no part of my invention. To the foot rests 2 of each gang, I secure the rear ends of draft links 12 which have their front ends connected with a draft beam 13 whereby when said beam is connected with a draft team or a tractor the cultivator will be drawn over the ground. Upon referring to Fig. 1 more particularly, it will be noted that the draft links 12 attached to the middle cultivator are engaged directly with an eye 14 fixed to the draft beam 13 at the center thereof so that this central cultivator will be fixed relative to the draft beam and will always be at the center of the same and in position to act upon the central row of plants. The outer cultivators are arranged in staggered relation to the central cultivator and are preferably set in advance of the same, as clearly shown in Fig. 1, thereby avoiding interference between the gangs of cultivator disks when the outer cultivators are shifted laterally so as to be adjusted to the width of the rows. It will be understood, however, that the arrangement may be reversed, the middle cultivator being set in advance of the outer cultivators. The draft links 12 attached to the outer or side cultivators have their front ends engaged with an eye 15 which is in turn carried by a clevis or stirrup 16 which is shiftable laterally along the draft beam 13. To effect the lateral shifting of the clevis 16 and consequently the adjustment of the eye 15 and the draft links 12, the rear edge of the draft beam 13 is constructed with a longitudinal notch or recess 17 in its rear edge at each end and across the outer side of this notch or recess is secured a strap 18 which passes through the clevis 16. A roller 19 is mounted in the front end of the clevis 16 and is adapted to run along the front side of the strap 18 so that frictional wear will be minimized and the desired adjustment easily effected. A draft loop or longer clevis 20 is pivoted to the draft beam 13 and projects beyond the front edge of the same, coupling rods or traces 21 being attached to the front ends of the clevises 20 and extending forwardly therefrom to be connected to a tractor or hitched to a draft team. It will be understood, of course, that the clevises 16, 20 and the cooperating elements are duplicated at the two ends of the draft beam 13, as shown in Fig. 1. Pivoted to and extending inwardly from each clevis 16 is a connecting rod 22 which has its inner end pivoted to the outer arm of an angle lever 23 which is fulcrumed at its angle upon the draft beam and has its inner arm pivotally connected to a connecting rod 24 which extends rearwardly and upwardly therefrom. Carried by the upper end of the bracket or arm 4 on the central frame 3 is a frame 25 which is substantially U-shaped and projects laterally to each side of the said bracket 4 and which may conveniently be formed from two L-shaped metallic straps, as shown clearly in Fig. 4. Upon each side of the frame 25 is secured a segment or holding rack 26 and concentric with said rack is pivoted a hand lever 27 which is equipped with a latch to cooperate with the rack. Below its fulcrum each lever 27 is offset outwardly, as shown at 28, and is then carried downwardly, as shown at 29, the rear end of the respective connecting rod 24 being pivotally attached to the lower end of said terminal portion 29, as clearly shown in Fig. 4.

It will now be seen that if either hand lever 27 be swung forwardly the connecting rod 24 pivoted thereto will be drawn rearwardly and the corresponding angle lever 23 thereupon rocked so that the rod 22 and the clevis 26 connected therewith will be moved outwardly. As a result of this manipulation, the outer or side cultivator will be shifted laterally so as to operate at a greater distance from the middle cultivator and, of course, if the hand lever be shifted in the opposite direction, the side cultivator will be drawn inwardly so as to operate nearer the middle cultivator. The latch engaging the respective holding rack 26, of course, holds the parts in the position in which they may be set and the adjustment of the side cultivators may be effected without stopping the travel of the machine so that if the spacing of the rows should be irregular or uneven the outer cultivators may be shifted so as to occupy the proper relation to the middle cultivator to effectually cultivate all the rows. My invention may obviously be applied to gang implements of various forms and may be produced at a low cost, may be easily manipulated, and will effectually perform its allotted functions.

It is to be understood that the device may be arranged to accommodate gangs of five, seven or more cultivators according to the available hauling power, although it may be necessary to mount the draft beam on carrying wheels to help sustain the weight.

Having thus described the invention, I claim:

In an agricultural implement, the combination of a draft beam, a tilling instrumentality having a fixed connection with the draft beam, a second tilling instrumentality, draft links extending forwardly from the last-mentioned tilling instrumentality, a clevis connected with the front ends of said links and having a sliding connection with the draft beam, an angle lever fulcrumed upon the draft beam and having one end operatively connected with said clevis, a hand lever upon the first-mentioned tilling instrumentality, and operative connections between said hand lever and the angle lever.

In testimony whereof I affix my signature.

SAMUEL W. COKER. [L. S.]